United States Patent

[11] 3,603,343

| [72] | Inventor | Nicholas W. Keller<br>Chicago, Ill. |
|---|---|---|
| [21] | Appl. No. | 852,744 |
| [22] | Filed | Aug. 25, 1969 |
| [45] | Patented | Sept. 7, 1971 |
| [73] | Assignee | Justrite Mfg. Co.<br>Chicago, Ill. |

[54] DRUM VENT VALVE
8 Claims, 4 Drawing Figs.

| [52] | U.S. Cl. | 137/493.6,<br>137/512.1, 137/533.11, 137/549 |
|---|---|---|
| [51] | Int. Cl. | F16k 17/26 |
| [50] | Field of Search | 137/493.8,<br>493.9, 493.7, 493, 493.1, 493.2, 493.3, 493.5,<br>493.6, 493.4, 512.1, 533.11, 549 |

[56] References Cited
UNITED STATES PATENTS

| 1,891,119 | 12/1932 | Stover | 137/493 X |
| 1,893,942 | 1/1933 | Jensen | 137/493.6 X |
| 1,973,258 | 9/1934 | Jensen | 137/493.6 X |
| 2,016,278 | 10/1935 | Ehlers | 137/493.4 X |
| 2,103,935 | 12/1937 | Cossais | 137/493.3 X |
| 2,349,137 | 5/1944 | Brown | 137/493.5 |

*Primary Examiner*—M. Cary Nelson
*Assistant Examiner*—Robert J. Miller
*Attorney*—Alter, Weiss & Whitesel ABSTRACT: A drum vent valve for both venting and sealing fluid-filled drums. The valve shell consists of only two parts, and the valve itself comprises an internal pressure relief valve portion for preventing explosions and for enabling bleeding of excess pressure caused by minor temperature differentials. At the same time, an oppositely acting external pressure relief valve acts to vent the drum when removing fluids therefrom.

PATENTED SEP 7 1971

INVENTOR

BY *Alter and Weiss*

ATTORNEYS

DRUM VENT VALVE

This invention relates to valves and more particularly to drum vent valves such as those used in venting drum containers when removing fluids from the drums. It is, of course, essential to replace the fluids removed from drum containers with air or the like to maintain the normal pressure differential inside and outside of the drum.

In the past, hand-operated valves have been used for venting the valve to the atmosphere. For example, when a spigot was operated to remove liquid or fluid from the drum, the hand-operated valve located in a bunghole at the portion of the drum above the liquid would be operated to enable atmospheric air to enter the drum and replace the fluid being removed therefrom. Even prior to such hand-operated vent valves, the bunghole cover was removed when liquid was removed from the drum.

The prior art, also teaches the use of automatic pressure relief valves for venting the inside of the drum container to the atmosphere. Thus, when fluids were removed from the drum, the pressure differential between the atmosphere and the vacuum within the drum caused by removal of liquid therefrom caused the pressure relief valves to open to enable air to fill the drum.

It has been found, however, that pressure relief valves are not sufficient for safety purposes in use with liquid-containing drums. Often times the pressure on the inside of the drum varies with temperature differentials. Thus, at times, the pressure on the inside of the drum may be higher than the atmospheric pressure surrounding the drum, or the pressure on the inside of the drum may be lower than the atmospheric pressure surrounding the drum.

If the pressure within the drum is higher than the pressure on the outside of the drum, the normally used venting relief valve does not perform the job of relieving the pressure. Thus, a plurality of valves were often utilized; one for relieving pressure if the pressure within the drum was greater than the atmospheric pressure, and the other for enabling the atmospheric air to replace the vacuum left within the drum by the removal of the liquid within the drum. Further, for safety purposes it is extremely beneficial to have a valve which enables a faster change in equalization of the pressures. Thus, if there is a fire within the drum, pressure builds up very fast and the normally used pressure relief valves would not be sufficient to relieve the pressure, and the drum could still explode. Thus, it is desirable to have an emergency pressure relief valve to relieve excess pressure in addition to the normal pressure relief valve. The valve should also be equipped to vent and equalize the pressures within and without the drum by venting the inside of the drum to atmosphere during the removal of liquids therefrom.

An object of the present invention is to provide a dual action drum vent valve comprised of a minimum of parts but nonetheless fully compatible to all known safety requirements.

A related object of this invention is to provide a dual action drum valve that not only vents the inside of the drum to the atmosphere during the removal of liquids from the drum and vents and relieves the pressure that may build up within the drum due to temperature differentials normally occurring, but a valve that also relieves excess pressures if gases are generated faster than the normal relief valve can act to enable the pressure to be relieved.

A preferred embodiment of the inventive drum vent valve comprises a housing which consists only of a cap and a body portion. The bottom body portion contains an apron portion that is threaded to fit into a pipe coupling. The internal valve structure comprises a normal pressure relief valve, an excess pressure relief valve and a vacuum relief valve, all contained within the housing portion. A characterized flame arresting means is located at each end of the valve housing to prevent any flashback whether flames are within the drum or are outside the drum.

The above-mentioned and other features and objects of this invention and the manner of obtaining them will become more apparent and the invention itself will be best understood by reference to the following description of an embodiment of the invention taken in conjunction with the accompanying drawings, wherein.

Figure 1:
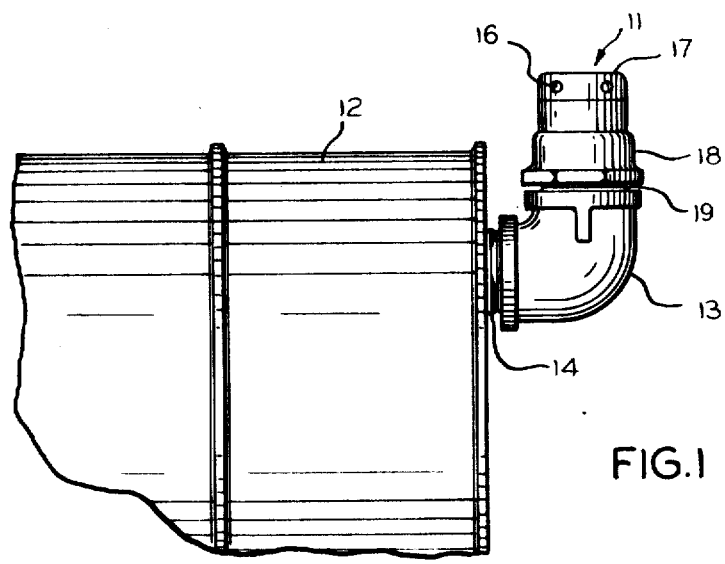
FIG. 1 is a side view showing of a drum having a drum vent valve mounted thereon at the bunghole opening.

In the drawings, like parts are identified with the same numbers on all of the different views. Turning now to those drawings, in FIG. 1 a drum vent valve 11 is shown mounted at the bunghole of a drum 12 which is lying on its side as is normal when extracting liquids or fluids from such drums. The valve 11 is threaded into an elbow coupling 13 which in turn is coupled to the bunghole of the drum using a nipple 14.

It should be understood that when a spigot is opened to enable the liquid or fluid within the drum to flow from the drum, the valve automatically vents the drum to the atmosphere thereby maintaining equal pressure between the inside and the outside of the drum.

Means are provided on the valve for enabling the flow of air into and out from the valve. More particularly, as seen in FIG. 1, a plurality of ports are located along the cap portion of the housing of the valve. The ports 16 are in the cap portion 17 of the valve 11.

Means are provided for attaching the cap 17 to body 18. More particularly, the cap 17 screws into the main body portion 18 of valve 11. Similarly, the main body portion has a pipe-threaded apron section 19 for coupling the valve to the elbow 13.

Figure 2:
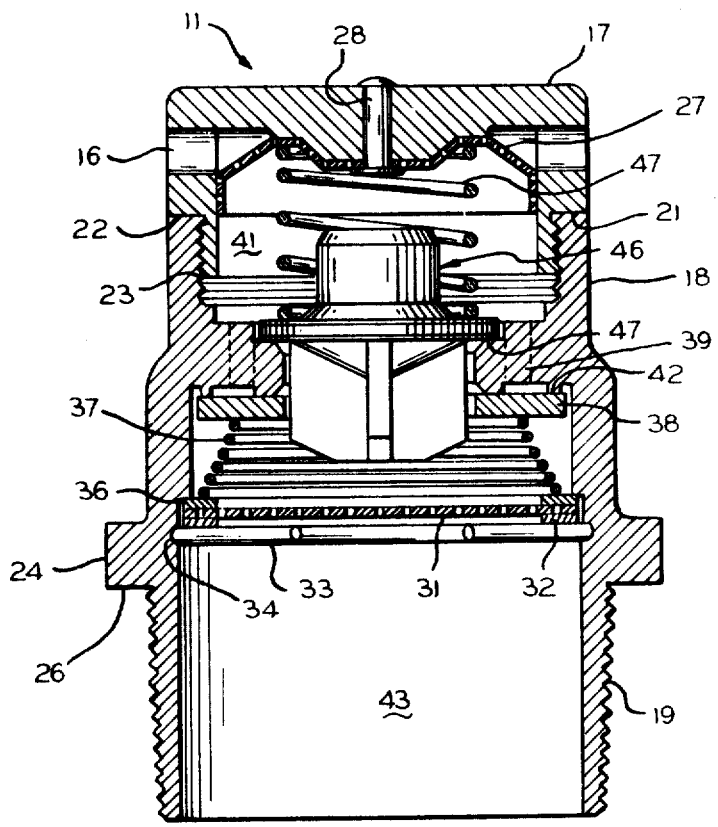
FIG. 2 is a sectional view of the inventive drum vent valve showing a side view of the main pressure relief valve within the sectionalized body.
Figure 3:
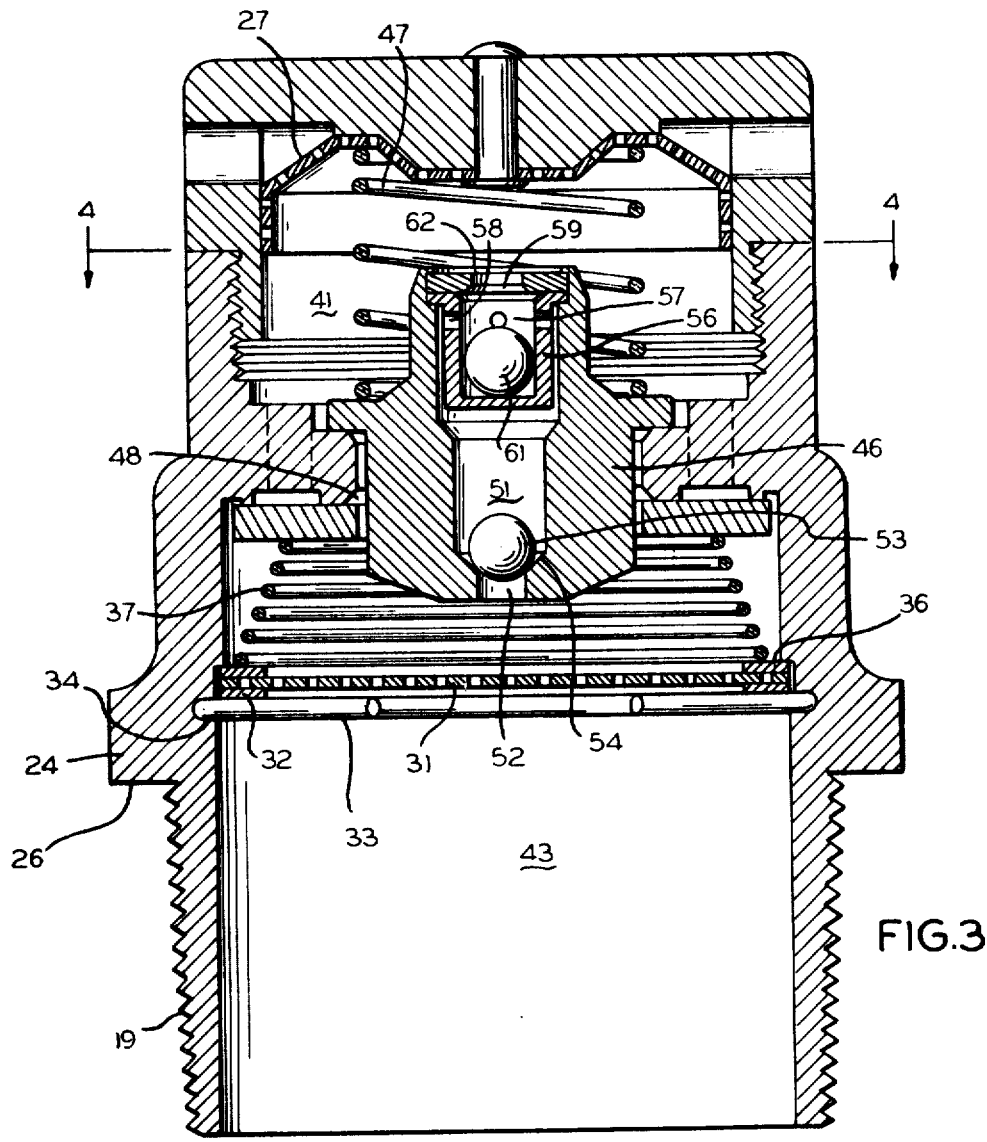
FIG. 3 is a sectional view of the valve body and the main pressure relief valve.
Figure 4:
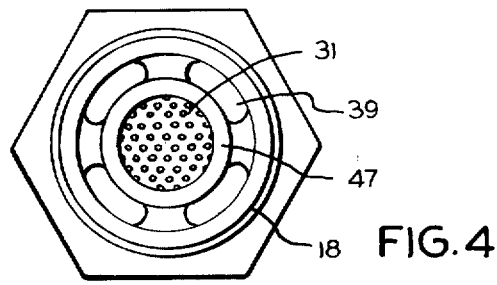
FIG. 4 is a top view of the valve taken along a line 4—4 looking in the direction of the arrows.

FIG. 2 shows the housing arrangement of the valve particularly well. In addition, some of the other safety features of the valve are illustrated out in FIGS. 2, 3 and 4. As shown in FIGS. 2 and 3, the housing of the valve is comprised of only two sections, the cap 17 and the body 18.

The cap section 17 is shown with an inverted circumferential shelf 21 thereon which meshes against the top of ledge 22 of body section 18 to aid the meshing threads 23 in forming an airtight seal.

The pipe thread on apron 19 is topped by a flanged section 24. The bottom of the flanged section 26 does not have to mesh with the elbow flange since the pipe threads 19 provide a seal between the elbow coupling 13 and the valve 11.

Means are provided to prevent any flash fires that may occur from spreading from either from the interior of the drum to the exterior thereof or in the opposite direction. Thus, for example, when the valve is venting it is also enabling the fumes from the drum to pass to the atmosphere. If these fumes are flammable, a fire could start at the outside of the valve around the ports 16. Then, of course, if the fire was able to jump to the inside of the drum, an explosion would occur. The passage of flames is prevented with the cap screen flame arrestor 27. The flame arrestor is located within the cap so as to partition off the ports 16 from the inside of the valve.

The flame arrestor is a screen or a meshed sheet metal section shaped and located to separate the cap parts from the inside of the valve. It has been found that vapors pass readily through the screen, but the flames do not. For example, if there is a flame in the vapors passing to the outside of the valve, the flame is prevented by the screen from igniting the vapors in the top of the body 18, and thus preventing what could be extremely deleterious to the operation of the valve even if an immediate explosion did not occur. If the flame did spread within the valve, the operation of the valve would be impaired, and this itself could cause future explosions.

Means are provided for holding the characterized screen in place. For example, rivet 28 is shown attached to the cap and to the screen 27 to securely maintain the screen contiguous to the inside top portion of the cap. The screen arrestor 27 is shaped to follow the contour along the bottom of the top cap section and along the sidewalls immediately below the ports. A diagonal portion of the screen crosses the entrances of the ports to effectively isolate the ports from the inside of the cap. It has been found that the screen operates effectively and by being attached to the cap that the attachment thereof assures that it is never left out of the reassembly of the valve when it is disassembled. Thus, the safety features that are provided by the flame arrestor are always present.

It should be understood that the flame arrestor protects not only the flammable fluid within the drum but also protects the drum from flames which otherwise could cause malfunctioning of the valve.

Similarly, another flame arrestor is located at the bottom portion of the valve to assure that it there is any flame within the drum itself, the valve will be protected from the flame, and thus be able to operate to prevent an explosion. The other flame arrestor is shown as arrestor housing screen 31. Screen 31 rests on a screen base ring 32. The screen base ring itself fits onto a screen block wire 33 which is spring loaded into a notch 34 in the main body section of the valve opposite flange 24.

Vacuum relief means are provided by the valve to enable air to enter the drum if the air pressure outside the drum is greater than the internal pressure. More particularly, a base ring 36 rests on top of the screen and acts to hold the vacuum relief spring 37 thereon. The vacuum relief spring shown in the drawings is conically shaped and it functions to hold the vacuum relief plate 38 in place on a sealing aperture such as aperture 39 leading the upper or port compartment 41 of the valve. The vacuum relief spring 37 is of sufficient strength to hold plate 38 pressed contiguous to ledge 42 which is ground to provide a valve seat for valve plate 38.

When the pressure in the atmosphere is greater than the pressure within the drum, the pressure in the upper compartment 41 vented to the atmosphere by ports 16 is greater than the pressure in the lower compartment 43 that is coupled directly to the interior of the drum. Plate 38 is subjected to the pressure differential. When the pressure differential is sufficient to force plate 38 against spring 37 away from ledge 42, then air is able to enter the drum through chamber or compartment 43.

The differential pressure wherein the atmospheric pressure is greater than the drum pressure occurs, among other ways, when the fluid within the drum is being removed. Until the air goes into the drum through the vacuum relief valve, there is a partial vacuum within the drum which causes the pressure differential.

In one preferred embodiment of the valve, the vacuum relief portion enables a 4-gallon-per-minute flow through a standard ¾-inch drum faucet without any undue pressure differential.

If there were no means for balancing out and equalizing the pressures, eventually the vacuum would be sufficient to prevent the flow of liquid from the drum. Even if the pressure differential was not that great, it still would be sufficient to slow the flow of fluid from the drum. As soon as the pressure differential is removed, then spring 37 once again forces relief plate 38 against the ledge 42 thereby preventing the passage of any air or vapor through apertures such as aperture 39.

Pressure relief means are provided for automatic use when there is excess pressure within the drum as compared to the atmospheric pressure. This pressure relief means is shown as a main relief valve assembly 46. A main pressure relief valve spring 47 which is shown as conically shaped normally maintains the main valve stem 46 tightly against shoulder 47 in body 18. Thus, when there is a pressure differential between the interior of the drum and the atmosphere such that the pressure in the drum is higher than in compartment 41 of the valve by an amount sufficient to force the main pressure relief valve assembly 46 away from the valve seat passageway or main port 48 within the body 18 then vapors from within the drum pass through port 48, compartment 41, the flame arrestor cap screen 27 to ports 16 and to the atmosphere. If there was no way for these vapors under high pressure to escape, than an explosion would most likely occur.

Relief means are also provided for relieving nonexcessive pressures from within the drum when they are not sufficiently high to cause spring 47 to compress. The nonexcessive pressure relief means are the ball relief valve of the main relief valve assembly 46. The ball relief valve is best seen in FIG. 3. As is shown therein the main pressure relief valve assembly 46 has a passageway 51. Orifice 52 leads to the passageway 51. Blocking the orifice 52 of the passageway is a ball 53. The ball 53 is shown held by gravity in orifice 52. While, it should be understood that normally spring means are used to keep the ball in the valve seat until a desired pressure differential is present. The orifice 52 has shoulders 54 designed to mate with ball 53 to provide a valve seat forming an efficient seal blocking any vapors from passing from the drum through port 51.

Port 51 extends around chamber walls 56 which define chamber 57. A plurality of ports such as ports 58 are located within the walls 56 of the chamber 57. Orifice 59 connects upper ball valve chamber 57 to upper chamber 41 of the valve. Thus, when the pressure in the drum and accordingly in chamber 43 is insufficient to force the main assembly against spring 47 but is sufficient to lift the ball 53 against the force of gravity vapors will pass around ball 53 into chamber 51 through orifice 58 and out through passage 59 to chamber 41 and thereafter to the outer atmosphere through ports 16.

Means are provided for assuring that the main pressure relief valve assembly 46 will operate as previously described when the pressure builds up sufficiently. More particularly, as second ball 61 is located in chamber 57. When there is sufficient differential pressure between the interior and exterior of the drum, the velocity of the gases going through chamber 57 and through orifice 59 cause "Bernoulli" forces to lift ball 61 and block orifice 59. It can be seen that passage 59 also has shoulders 62 designed to mate with ball 61 to seal the passage 59. With passage 59 blocked, all of the forces are once again asserted on the main valve assembly 46 pushing it against spring 47 to open the main orifice 48 of the valve thereby preventing explosions from occuring because of the pressure differential.

While I have shown specific construction and arrangement of the parts and features constituting my invention, I am fully cognizant of the fact that many changes may be made in their construction without effecting the operativeness of the device, and I reserve the rights to make such changes as I may deem convenient, or necessary, without departing from the spirit of my invention, or the scope of the appended claims.

Having thus described my invention, what I claim and desire to secure by Letters Patent in the United States, is:

1. A drum vent valve for controllably venting the interior of a drum container to the atmosphere,
   said valve comprising housing means,
   said housing means consisting of a cap portion means and a main body portion,
   each of said portions having an individually associated fire-arresting screen,
   means for attaching said cap portion means to said main body portion,
   said cap portion means and said main body portion forming an upper compartment closed at the top by one of said fire-arresting screens,
   said one fire-arresting screen being joined to said cap portion means in a manner which prevents removal of said one screen from said cap means when said valve is serviced in the field,
   apron means at the bottom of said main body portion for attaching said valve to the drum container, the bottom of said main body portion forming a lower compartment closed at the bottom by the other of said fire-arresting screens, and joined with the interior of said drum, means in said cap for joining the upper compartment to the atmosphere via said one fire-arresting screen, ledge means integral to said body section located between the upper compartment and the lower compartment, said ledge defining a centrally located valve seat passageway connecting said upper compartment and said lower compartment, main pressure relief valve assembly means normally seated within said valve seat passageway to prevent flow therethrough until the lower compartment pressure is a determined amount greater than the upper compartment pressure, aperture means in said ledge coupling said upper compartment to said lower compartment, and vacuum relief plate means located below said ledge and contiguous thereto to normally prevent flow through said aperture means until the upper compartment pressure is a certain amount greater than the lower compartment pressure.

2. The drum vent valve of claim 1 wherein said main pressure relief valve assembly means comprises means for relieving pressures within the drum slightly in excess of the normal atmospheric pressure without moving said main pressure relief valve assembly from said centrally located valve seat passageway.

3. The drum vent valve of claim 2 wherein said main pressure relief valve assembly comprises a main pressure relief valve stem shaped to block said valve seat passageway, said valve stem having a stem passageway therethrough connecting said upper and lower compartments, first orifice means at the bottom of said valve stem passageway, said first orifice means terminating in a valve seat at the top part thereof, first ball valve means normally located within said seat to block said first orifice means, means for maintaining said first ball valve means in said seat until the pressure in said stem passageway is a required amount below the pressure in said first orifice for enabling the passage of fluids through said stem passageway, and blocking means for preventing the passage of fluids through said stem passageway even with said first ball valve means lifted away from said first orifice means, said blocking means operated responsive to a sufficient flow of fluids through said passageway.

4. The drum vent valve of claim 3 wherein said blocking means comprises second ball valve means, said second ball valve means held in a normally nonblocking position by gravity and moved to a blocking position by Bernoulli forces.

5. The drum vent valve of claim 3 wherein a chamber is provided as a part of said passageway, said chamber having second orifice means leading to said upper compartment, valve seat means at the bottom portion of said second orifice means, and wherein said blocking means comprises second ball valve means normally located under force of gravity at the bottom of said chamber and shaped to fit within said second orifice means to block said passageway, port means formed in the walls of said chamber only over the top of said second ball valve in said normal location and joining said chamber to said passageway, and said ports located so as to cause said second ball valve means to be moved into said valve seat of said second orifice means to block said second orifice means responsive to a sufficient flow of fluids through said passageway and for maintaining said second ball valve means in said second orifice responsive to sufficient pressure differential between the upper compartment pressure and the lower compartment pressure.

6. The drum vent valve of claim 2 wherein said valve stem comprises plate means normally located contiguous to said valve seat passageway and a section disposed below said plate means, said section disposed below said plate means comprising a plurality of radial fins whereby said valve stem is maintained in a stable position during the movement of the valve stem.

7. The drum vent valve of claim 6 wherein first resilient means are provided for maintaining said valve stem within said valve seat passageway under normal pressure conditions, and wherein second resilient means are provided for maintaining said plate means contiguous to the bottom of said ledge means under normal pressure conditions.

8. A drum vent valve for controllably venting the interior of a drum container to the atmosphere, said valve comprising housing means, said housing means consisting of a cap portion means and a main body portion, means for attaching said cap portion means to said main body portion, said cap portion means and said main body portion forming an upper compartment, apron means at the bottom of said main body portion for attaching said valve to the drum container, the bottom of said main body portion forming a lower compartment joined with the interior of said drum, means in said cap for joining the upper compartment to the atmosphere, ledge means integral to said body section located between the upper compartment and the lower compartment, said ledge defining a centrally located valve seat passageway connecting said upper compartment and said lower compartment, main pressure relief valve assembly means normally seated within said valve seat passageway to prevent flow therethrough until the lower compartment pressure is a determined amount greater than the upper compartment pressure, aperture means in said ledge coupling said upper compartment to said lower compartment, vacuum relief plate means located below said ledge and contiguous thereto to normally prevent flow through said aperture means until the upper compartment pressure is a certain amount greater than the lower compartment pressure, a chamber being provided as a part of said passageway, said chamber having second orifice means leading to said upper compartment, valve seat means at the bottom portion of said second orifice means, and wherein said blocking means comprises second ball valve means normally located under force of gravity at the bottom of said chamber and shaped to fit within said second orifice means to block said passageway, port means formed in the walls of said chamber only over the top of said second ball valve in said normal location and joining said chamber to said passageway, and said ports located so as to cause said second ball valve means to be moved into said valve seat of said second orifice means to block said second orifice means responsive to a sufficient flow of fluids through said passageway and for maintaining said second ball valve means in second orifice responsive to sufficient pressure differential between the upper compartment pressure and the lower compartment pressure.